(12) United States Patent  (10) Patent No.: US 9,376,262 B2
Schroeder  (45) Date of Patent: Jun. 28, 2016

(54) SEPARATED DRIVE AND SEALING DEVICE FOR SCREW CONVEYOR

(71) Applicant: Douglas Kent Schroeder, Estherville, IA (US)

(72) Inventor: Douglas Kent Schroeder, Estherville, IA (US)

(*) Notice: Subject to any disclaimer, the term of this patent is extended or adjusted under 35 U.S.C. 154(b) by 62 days.

(21) Appl. No.: 14/291,737

(22) Filed: May 30, 2014

(65) Prior Publication Data

US 2015/0344232 A1  Dec. 3, 2015

(51) Int. Cl.
| | | |
|---|---|---|
| *B65G 33/00* | (2006.01) | |
| *B65G 33/26* | (2006.01) | |
| *B65G 33/32* | (2006.01) | |
| *B65G 33/34* | (2006.01) | |

(52) U.S. Cl.
CPC ............... *B65G 33/32* (2013.01); *B65G 33/34* (2013.01)

(58) Field of Classification Search
None
See application file for complete search history.

(56) References Cited

U.S. PATENT DOCUMENTS

| | | | | |
|---|---|---|---|---|
| 2,246,805 A | * | 6/1941 | Marshall | F16C 33/74 384/132 |
| 3,770,109 A | | 11/1973 | Kraft | |
| 3,975,058 A | * | 8/1976 | York | B65G 53/48 277/351 |
| 4,395,047 A | * | 7/1983 | Lahner, III | F16J 15/40 277/430 |
| 5,131,883 A | * | 7/1992 | Hendriks | A22C 13/0009 452/21 |
| 6,206,177 B1 | | 3/2001 | Broten | |
| 8,181,969 B2 | * | 5/2012 | Price | F16C 33/76 277/512 |

\* cited by examiner

*Primary Examiner* — Kavel Singh
(74) *Attorney, Agent, or Firm* — McKee, Voorhees & Sease, PLC

(57) ABSTRACT

The present invention relates to screw conveyors, in particular a screw conveyors with a separated drive and sealing device. In an aspect of the invention, the screw conveyor is part of an auger. An embodiment of the invention employs tapered bearings, which can withstand both radial and directional forces. A sealing member can also be included to aid in preventing debris from contacting the bearings.

20 Claims, 4 Drawing Sheets

SEPARATED DRIVE AND SEALING DEVICE FOR SCREW CONVEYOR

FIELD OF THE INVENTION

The present invention relates to screw conveyors, in particular a screw conveyor with a separated drive and sealing device. In an aspect of the invention, the screw conveyor is part of an auger.

BACKGROUND OF THE INVENTION

A screw conveyor, also known as an auger conveyor, employs a rotating blade in a helical shape. The helical blade is referred to as a flighting. The flighting is typically contained within a cylinder, often called an auger tube. As the flighting rotates within the cylinder, it is able to move materials, including, for example, liquids, granular materials, etc. A very well-known application is a grain auger, which is used to move grains.

Traditional screw conveyors employ roller bearings which incorporate a seal within the bearing. The bearing is mounted directly to the auger tube. This often results in dirt, moisture, and/or materials moved in the auger tube being forced into the bearing. This causes the bearing to fail. A further problem with roller bearings is that they are only designed to withstand radial forces. When traditional roller bearings are subjected to directional forces, they ultimately will break. For example, U.S. Pat. No. 3,770,109 disclosed a traditional screw conveyor employing roller bearings; however, the design, and in particular the use of roller bearings, weakened the design when the roller bearings were subjected to directional forces. In an effort to overcome the problems associated with roller bearings, attempts have been made at employing tapered bearings. For example, U.S. Pat. No. 6,206,177 disclosed a drive mechanism employing tapered bearings. However, the drive mechanism was mounted directly on the auger tube, which caused this design to suffer from a number of problems. First, the direct mounting to the auger tube made it too rigid of a configuration resulting in stress on the flighting, which eventually causes the flighting to break. Furthermore, the direct mounting to the auger tube necessitates that the seal is mounted inside the auger tube, which results in dirt, grain, and moisture penetrating the dust cap and interfering with the bearings, ultimately causing the bearings to fail.

Accordingly, it is an objective of the claimed invention to develop a screw conveyor that overcomes the aforementioned deficiencies in the state of the art. In particular, it is an objective of the present invention to develop and employ bearings capable of withstanding both radial and directional forces.

A further object of the invention is to provide a sealing device that is separated from the bearing housing and not contained within the bearings.

A further object of the invention is to provide a screw conveyor with an improved coupler

SUMMARY OF THE INVENTION

An advantage of the present invention is that the separation between the bearing housing and sealing device reduces bearing failure, and the tapered bearings of the invention withstand both directional and radial force. An additional advantage of the invention is the prevention of dirt, moisture, and materials leaking out of the auger tube and interfering with the drive mechanism. Still a further advantage of the present invention is that the coupler permits some misalignment without placing too much stress on the parts.

In some embodiments, the invention includes a flighting, a drive mechanism, a bearing housing, and a sealing device, wherein the sealing device and bearing housing are separated. The drive mechanism may comprise, consist essentially of, and/or consist of a drive shaft, a driven shaft, a coupler, and at least one tapered bearing.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
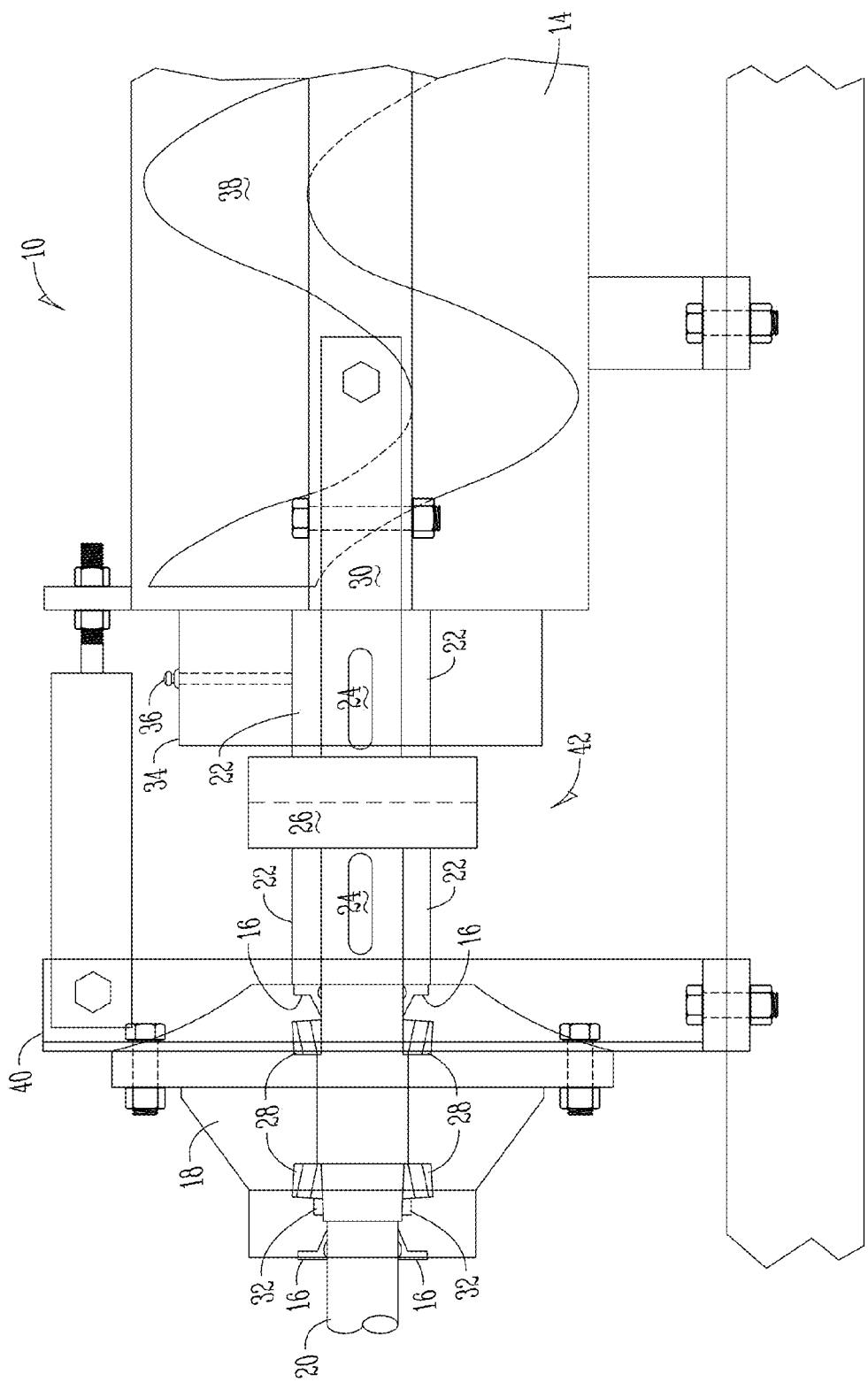
FIG. 1 shows an embodiment of the screw conveyor in a sectional side view.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The present invention relates to screw conveyors with a separated drive and sealing device. The screw conveyors of the invention have many advantages over traditional screw conveyors. For example, the invention has the advantage of being used in increased auger sizes, the separation between the bearing housing and sealing device reduces bearing failure, and the tapered bearings of the invention withstand both directional and radial forces. According to some aspects of the invention, the screw conveyor has the advantage of providing an improved seal to stop dirt, moisture, and material leaking. According to additional aspects of the invention, the screw conveyor has the advantage of alleviating stress on various parts despite misalignment and/or variation in consistent part sizing, which can be a result of normal wear and tear or due to manufacturing differences and/or defects with respect to part size. For example, grain auger equipment often includes both machined parts and modified parts.

The embodiments of the invention are not limited to particular screw conveyors, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

As used herein, the terms "screw conveyor" and "auger" or any variation thereof, are to understood as interchangeable and identify the same thing. These terms should not be narrowly construed to only encompass a certain type of application, e.g., grain augers, or certain type of flighting, e.g., shaftless spirals or flightings with a shaft.

Figure 2:
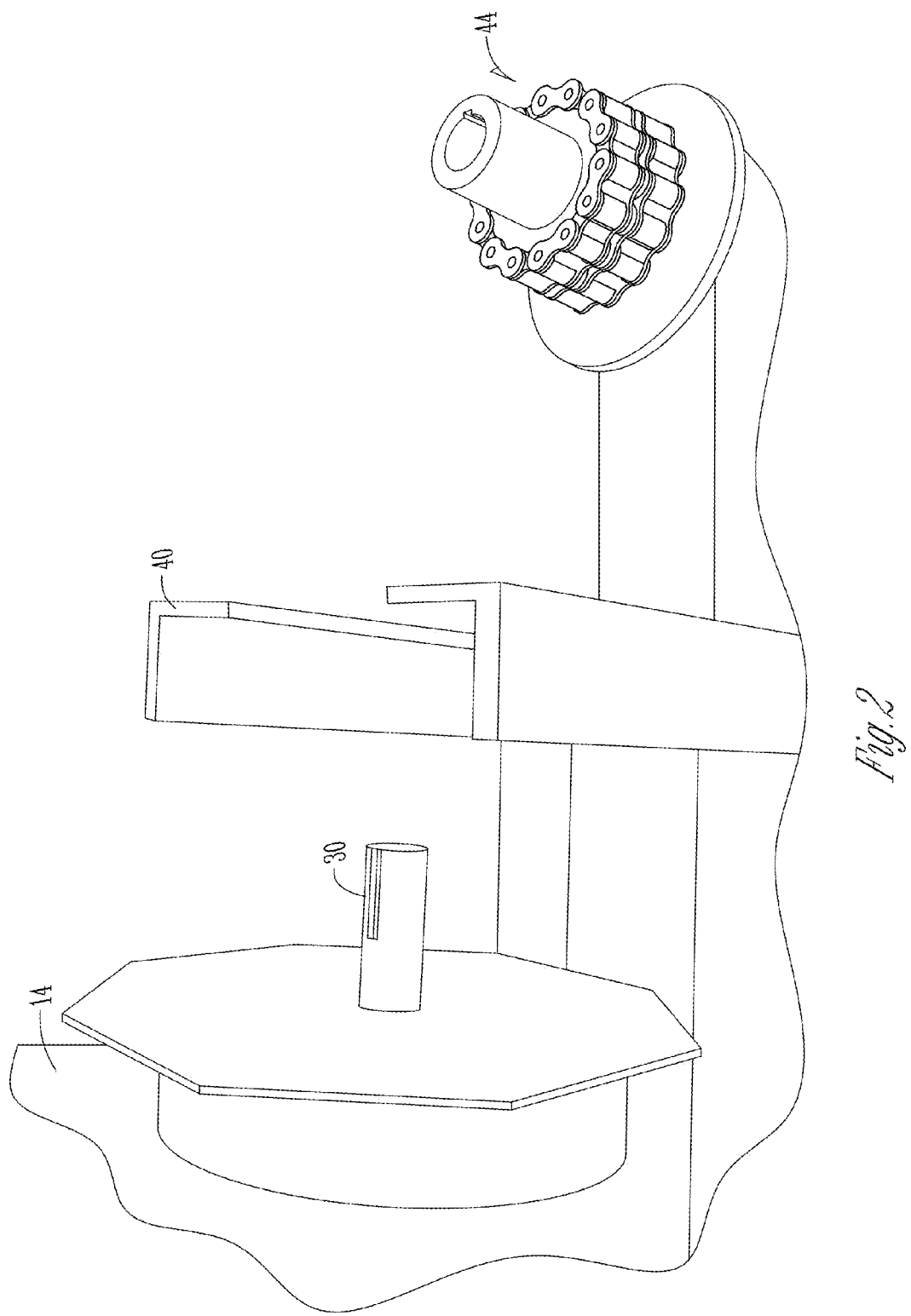
FIG. 2 shows an exploded perspective view of an embodiment of the screw conveyor.
Figure 3:
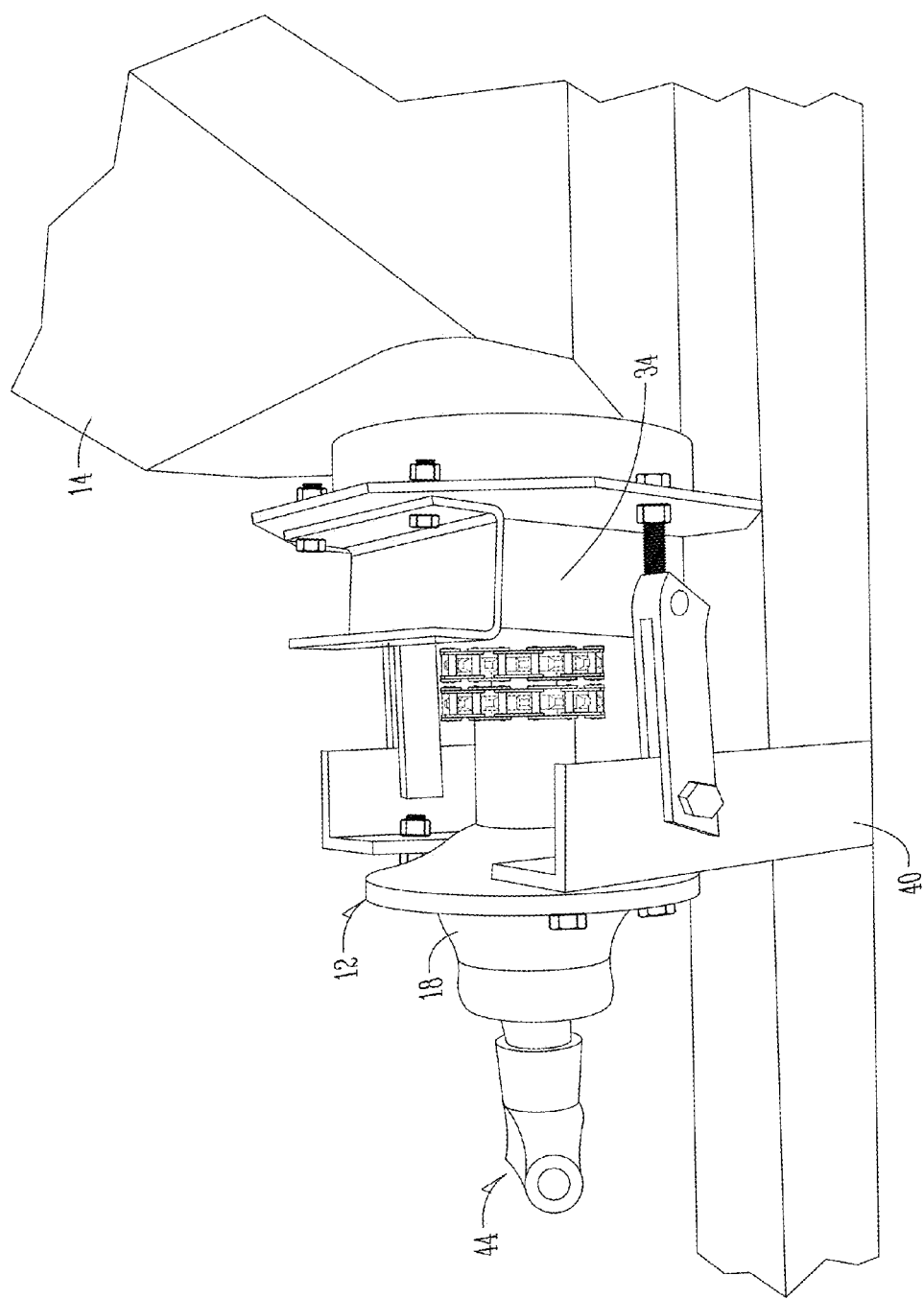
FIG. 3 shows a perspective view of an embodiment of the screw conveyor.
Figure 4:
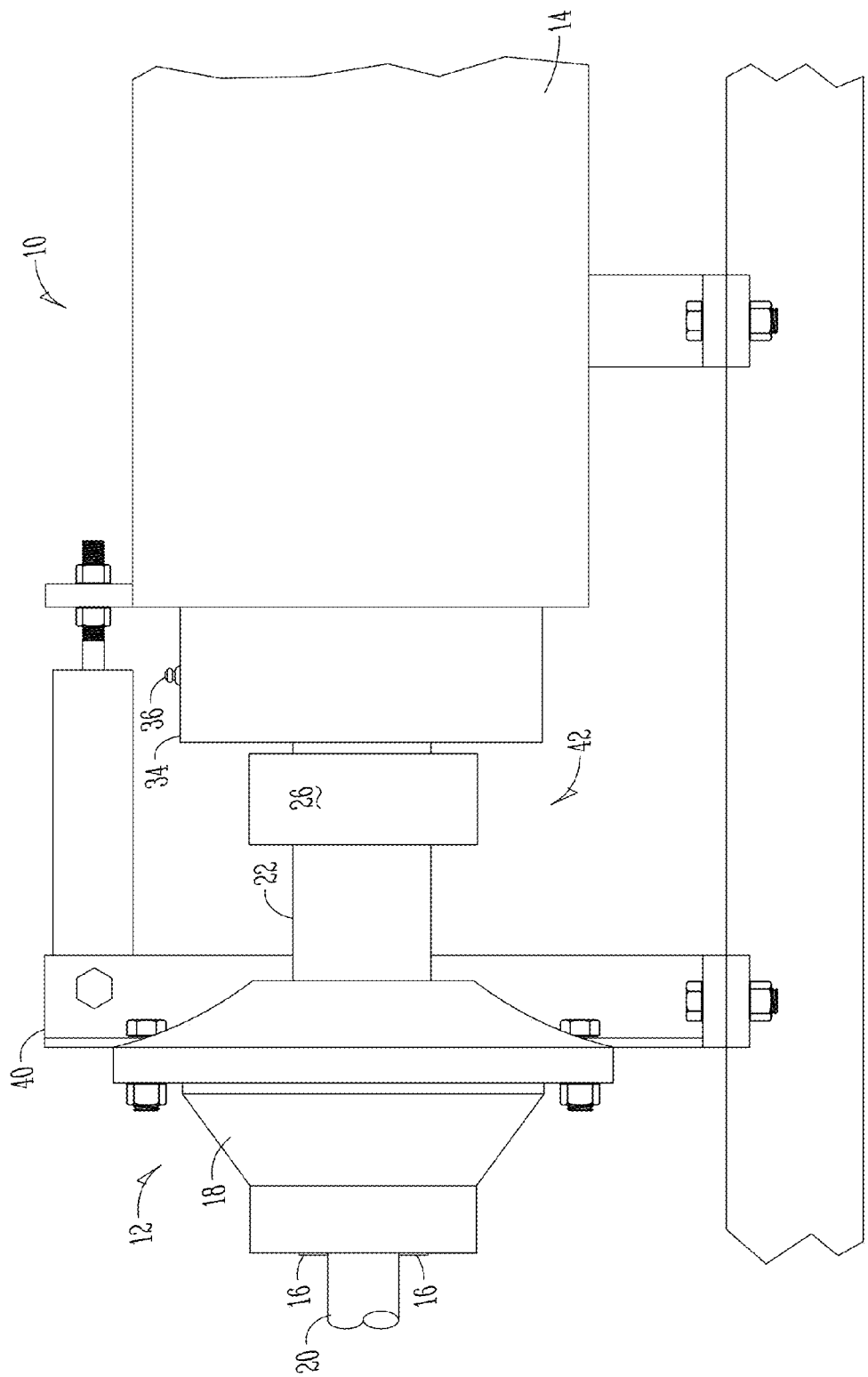
FIG. 4 shows a side view of an embodiment of the screw conveyor.

FIGS. 1-4 show exemplary embodiments of the invention. The screw conveyor 10 of the invention comprises a drive mechanism with at least one bearing 28, a bearing housing 12, a drive shaft 20, and a driven shaft 30. In an aspect of the invention, the screw conveyor 10 can comprise two or more bearings 28. In an embodiment of the invention containing two bearings 28, the bearings 28 may be opposed. In preferred embodiment of the invention the bearings 28 are tapered. Tapered bearings 28 of the present invention can withstand both directional and radial forces. This is beneficial as directional forces can be applied to the bearings 28 when the screw conveyor 10 is operating and the flighting 38 is turning. In another aspect of a preferred embodiment of the invention, the bearings 28 do not contain a sealant. In an embodiment of the invention, the drive mechanism can further comprise a locknut 32. When a locknut 32 is employed, it can be used to keep the bearings 28 in place.

The bearing housing 12 of the screw conveyor 10 covers the drive shaft 20. The bearing housing 12 can comprise a seal 16 and a hub 18. In an embodiment of the invention, the drive shaft 20 can be partially contained within a hub 18 positioned opposite a seal 16, wherein the tapered bearings 28 are contained within the bearing housing 12. In such an embodiment employing a locknut 32, the locknut 32 is also contained within the bearing housing 12. The bearing housing 12 can be positioned next to, in contact with, and/or partially covering the sleeve 22 covering the drive shaft 20.

The drive shaft 20 is operably connected to a driving means 44. In an embodiment the drive shaft 20 can extend from the bearing housing 12 to operably connect with a driving means. Any suitable means of driving 44 the drive shaft 20 can be employed. Non-limiting examples include a generator, engine, turbine, or power take off from a tractor. Any other means of driving 44 the drive shaft 20 can be employed and those of skill in the art are familiar with suitable driving means 44 and can properly select them for appropriate configurations and applications. The screw conveyor 10 of the present invention should not be limited by the means of driving 44 the drive shaft 20. It should be appreciated that the drive shaft 20 can be connected to the driving means in generally any known manner for the particular means.

The drive mechanism of the present invention further comprises a driven shaft 30. The driven shaft 30 is operably connected to the drive shaft 20. In an embodiment of the invention, the driven shaft 30 and drive shaft 20 are operably connected by a coupler 26. In an embodiment of the invention the coupler 26 may have one or more sleeves 22 adjacent to it. The coupler 26 may have a sleeve 22 adjacent on the drive shaft side and another sleeve 22 adjacent on the driven shaft side. In another embodiment of the invention, the coupler 26 may be adjacent to one sleeve 22 covering both the drive shaft 20 and driven shaft 30 of the coupler 26. According to aspects of the invention, the coupler 26 allows for some misalignment and thereby alleviates stress on the parts. In an embodiment of the invention, the one or more sleeves 22 can be keywayed or covering the drive shaft 20 and/or driven shaft 30 by other means. According to aspects of the invention, the driven shaft 30 is operably connected to the flighting 38. Any suitable means for operably connecting the flighting 38 to the driven shaft 30 may be employed. Those skilled in the art are aware of such means.

The screw conveyer 10 further comprises a sealing device 34. The sealing device 34 can be anything suitable for sealing the drive mechanism from the screw conveyor 10 such that moisture, dirt, dust, materials being moved in the auger tube 14, et cetera do not interfere with the drive mechanism, and in particular, with the bearings 28. In an embodiment of the invention, the sealing device 34 can comprise wood. Any suitable wood having properties that can withstand dirt and moisture can be used. In a further embodiment the sealing device 34 can be coated to improve the seal. For example, a lubricant such as grease can be applied to the sealing device 34. The lubricant can be applied to the sealing device 34 by any suitable means. In an embodiment, the lubricant can be applied by a grease zerk 36.

The sealing device 34 is mounted to the auger tube 14 so that it seals the auger tube 14 and thereby preventing dust, dirt, moisture, materials being moved in the auger tube 14 by the screw conveyor 10 from leaking out of the auger tube 14 and potentially interfering with the drive mechanism, in particular the tapered bearings 28. The sealing device 34 can further be used to help center the driven shaft 30. The sealing device 34 can be held in position by any means suitable for the particular auger configuration. In an embodiment of the invention, a frame 40 or other type of support may be used to hold the sealing device 34 in place. A preferred frame 40 is made of metal, such as steel. Any suitable material for making a frame 40 or support structure may be used. In an aspect of the invention, the sealing device 34 is separated from the drive mechanism. In an embodiment, the drive mechanism and sealing device 34 may be adjoined but are separate and distinct parts, such that there is a proper seal, which keeps the drive mechanism clean from materials such as dirt, dust, moisture, and the materials being transported by the auger. In a further embodiment there may be an actual separation of space between the drive mechanism and the sealing device 34, such that they do not touch, except that the drive shaft 20 pierces both.

EXAMPLE

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

An exemplary screw conveyor 10 embodying the invention as described above was prepared and tested. A flighting 38 was operably connected to a driven shaft 30 with a bolt. The flighting 38 is positioned at least partially within an auger tube 14. The driven shaft 30 was covered by a sleeve 22, which was affixed with a keyway 24. The driven shaft 30 was operably connected to a drive shaft 20 with a coupler 26. The drive shaft 20 was also covered by a sleeve 22, which was affixed with a keyway 24. The driven shaft 30 and sleeve 22 covering the driven shaft 20 pierced a sealing device 34. The sealing device 34 helped to center the driven shaft 30. The sealing device 34 was an oak block and had a grease coating, which provided an excellent seal. The grease was applied by a grease zerk 36. The sealing device 34 was mounted to the auger tube 14 and held in place with a steel frame 40. The sealing device 34 was in direct contact with the material being moved in the auger tube 14. The sealing device 34 and drive mechanism were separated by a space filled by air, i.e., an open air distance. This open air distance provides further protection to the hub 18, seal 16, and bearings 28 from any dirt, moisture, dust, et cetera.

The drive mechanism comprised two tapered bearings 28 positioned opposite to each other. A locknut 32 was used to hold the tapered bearings 28 tightly in place. The tapered bearings 28 and locknut 32 were within the bearing housing 12, which comprised a hub 18 and seal 16. The hub 18 and seal 16 were positioned opposite to each other, with the seal 16 being positioned next to the sleeve 22 covering the drive shaft 20. The drive shaft 20 pierced the hub 18 so that it could connect to a driving means 44. The driving means 44 employed was a power take off from a tractor.

The inventions being thus described, it will be obvious that the same may be varied in many ways. Such variations are not to be regarded as a departure from the spirit and scope of the inventions and all such modifications are intended to be included within the scope of the following claims.

The above specification provides a description of the manufacture and use of the disclosed compositions and methods. Since many embodiments can be made without departing from the spirit and scope of the invention, the invention resides in the claims.

What is claimed is:

1. A screw conveyor comprising:
   a drive mechanism comprising a drive shaft operably connected to a driven shaft by a coupler, wherein said driven shaft is operably connected to a flighting configured to rotate within an auger tube;
   said drive mechanism further comprising at least one tapered bearing, wherein said at least one tapered bearing is within a bearing housing and being rotationally aligned with the drive shall such that the drive shaft passes through said tapered bearing;
   wherein said bearing housing covers at least part of the drive shaft; and
   wherein said bearing housing is separated from a sealing device, said sealing device mounted to the auger tube and positioned at an end of the flighting to aid in preventing debris from interfering with the hearing housing.

2. The screw conveyor of claim 1 wherein said tapered bearings can withstand radial forces and directional forces.

3. The screw conveyor of claim 1 wherein said sealing device further comprises a coating that improves the sealing.

4. The screw conveyor of claim 1 wherein said sealing device is comprised of wood.

5. The screw conveyor of claim 1 wherein said tapered hearings do not contain a sealant.

6. The screw conveyor of claim 1 wherein said hearing housing and said sealing device are separated by an open air distance.

7. The screw conveyor of claim 1 wherein the drive shaft and drive shaft are each covered by a sleeve and wherein the sleeves are adjacent to the coupler.

8. The screw conveyor of claim 1 further comprising a grease zerk disposed within the sealing device.

9. The screw conveyor of claim 1 wherein said sealing device is configured to be in direct contact with materials being moved in the auger tube.

10. The sore conveyor of claim 1 wherein the drive shaft is operably connected to a driving means.

11. A screw conveyor comprising:
    a drive mechanism comprising a drive shaft operably connected to a driven shaft by a coupler, wherein said driven shaft is operably connected to a flighting configured to rotate within an auger tube;
    said drive mechanism further comprising at least two tapered bearings, wherein said at least two tapered bearings are within a bearing housing comprised of a hub and a seal and said at least two tapered hearings being rotationally aligned with the drive shaft such that the drive shaft passes through said tapered bearing;
    wherein said bearing housing covers at least part of the drive shaft; and
    wherein said bearing housing is separated from a sealing device, said sealing device being mounted to and positioned adjacent the auger tube at an end of the flighting such that the sealing device is positioned a distance from the bearing housing to aid in preventing debris from interfering with the bearing housing.

12. The screw conveyor of claim 11 further comprising a grease zerk disposed within the scaling device.

13. The screw conveyor of claim 11 wherein said sealing device comprises wood and wherein said wood is coated with a lubricant.

14. The screw conveyor of claim 11 wherein said drive shaft is operably connected to a tractor.

15. The screw conveyor of claim 11 wherein said bearing housing and said sealing device are separated by an open air distance.

16. The screw conveyor of claim 11 wherein said sealing device is configured to be in direct contact with materials being moved in the auger tube.

17. The screw conveyor of claim 1 wherein said tapered bearings can withstand radial forces and directional forces.

18. A screw conveyor comprising:
    a drive mechanism comprising a drive shaft operably connected to a driven shaft by a coupler, wherein said driven shaft is operably connected to a flighting configured to rotate within an auger tube;
    said drive mechanism further comprising at least two tapered bearings, wherein said at least two tapered bearings are within a bearing housing comprised of a hub and a seal, and said at least two tapered bearings being rotationally aligned with the drive shaft such that the drive shaft passes through said tapered bearing;
    wherein said bearing housing covers at least part of the drive shaft; and
    wherein said bearing housing is separated from a sealing device by an open air distance, said sealing device being mounted to and positioned adjacent the auger tube at an end of the flighting such that the sealing device is positioned a distance from the bearing housing to aid in preventing debris from interfering with the bearing housing; and
    wherein the drive shaft is operably connected to a driving means.

19. The screw conveyor of claim 18 wherein the drive shaft and drive shaft are each covered by a sleeve and wherein the sleeves are adjacent to or in contact with the coupler.

20. The screw conveyor of claim 18 further comprising a urease zerk within the sealing device.

* * * * *